Aug. 10, 1926.
H. P. GARDNER ET AL
1,595,393
ICE CREAM DISPENSER
Filed July 2, 1923
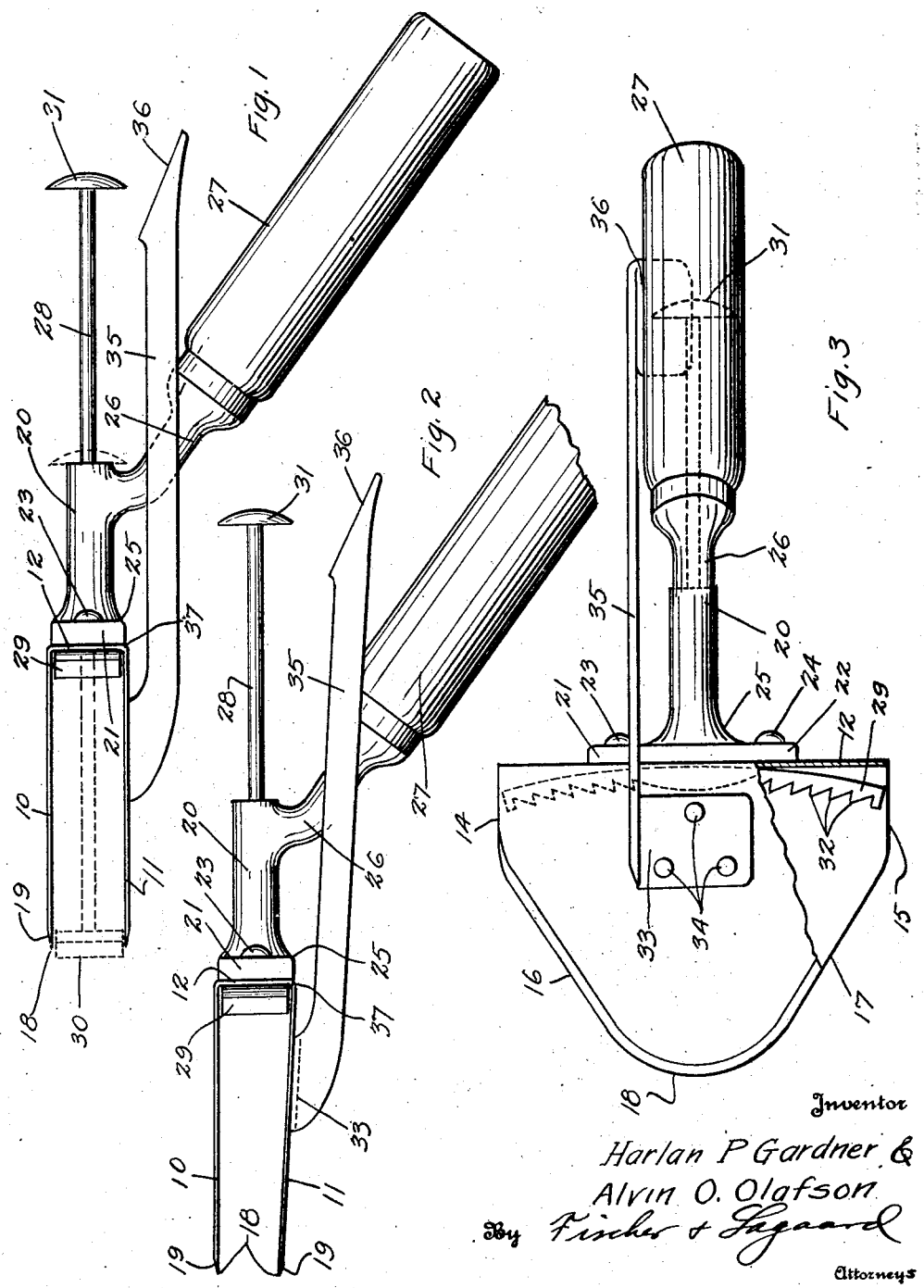
Inventor
Harlan P Gardner &
Alvin O. Olafson
By Fischer & Sigaard
Attorneys Patented Aug. 10, 1926.

1,595,393

UNITED STATES PATENT OFFICE.

HARLAN P. GARDNER AND ALVIN O. OLAFSON, OF ST. PAUL, MINNESOTA, ASSIGNORS TO THE PAR-PIE COMPANY, OF ST. PAUL, MINNESOTA.

ICE-CREAM DISPENSER.

Application filed July 2, 1923. Serial No. 648,928.

Our invention relates to ice cream dispensers and has for its object to provide an ice cream dispenser adapted to remove ice cream in slices from the bulk in a simple and effective manner.

Another object resides in providing a pair of parallel plates having knife edges by means of which the ice cream may be cut in slices.

A still further object resides in providing a structure whereby one of the plates is caused to move toward the other to hold the ice cream firmly between the said plates so that the ice cream can be readily broken away from the bulk at the edges of the slices and be removed from the bulk without danger of slipping out of the dispenser.

Another object of the invention consists of forming the plates with converging sides and to provide an ejecting means between the plates, which ejecting means is formed with serrated members adapted to prevent the ice cream from sliding when the same is ejected so that the slices ejected from the dispenser maintain the same shape as when severed from the bulk.

A still further object resides in providing an offset handle for said pair of parallel plates, which handle permits the operating member for the ejecting means and the member for moving the plates together to be readily operated and to prevent the knuckles of the operator from scraping against the ice cream can when the dispenser is manipulated up to the walls of the said can.

The full objects and advantages of our invention will be found in the detailed description thereof and are particularly pointed out in the claims.

In the drawings forming part of this specification:

Figure 1 is a side elevational view of our invention.

Figure 2 is a view similar to Figure 1 showing the parts in slightly altered position.

Figure 3 is a bottom view of the structure shown in Figure 1 with a portion of the same removed to illustrate the ejecting means of the invention.

In the use of ice cream scoops or dispensers for serving slices of ice cream considerable difficulty has been had in that the scoops have been inconvenient to manipulate and in that the ice cream, when ejected from the same, would spread outwardly and lose the shape to which it was originally cut, thereby preventing the same from readily fitting into similar shaped containers when the same was served in such containers. In addition, the slices of ice cream would frequently slip out of the dispenser before the same could be inserted or deposited where required, thereby causing waste and annoyance. In addition, previous dispensers where the handle issued directly out from the same were found to be inefficient in that the same could not be used close up to the walls of the can and that the knuckles of the user would be caused to rub against the can and become smeared with the ice cream from the same. Our invention overcomes these objections in a manner which will be presently explained.

Our invention, as best shown in Figures 1 and 3, comprises two parallel plates 10 and 11 preferably formed of a light spring material, which plates are bent out of a single sheet of material to form a U-shaped structure having a back 12. The plates 10 and 11 are shaped as shown in Figure 3 with parallel edges 14 and 15 which issue outwardly from the back 12 at right angles thereto for a short distance beyond the same. Connecting with these edges 14 and 15, the plates 10 and 11 are formed with converging edges 16 and 17 which meet in a rounded nose 18 formed in the extreme end of the said plates. The edges 16, 17, and 18 are sharpened, as indicated at 19, so that the said plates 10 and 11 may readily be inserted into the ice cream.

Attached to the back 12, we employ a casting 20 which is formed with two flanges 21 and 22 adapted to lie against the back 12 by means of which the said casting may be rigidly secured to the back 12 by two rivets 23 and 24, as best shown in Figure 3. The casting 20 has a longitudinal shank 25 formed along the same which has attached to its rear end a depending arm 26 to which is securely fastened a handle 27 by means of which the dispensing device may be easily manipulated. It will be noted in Figure 1 that the handle 27 is angularly disposed and offset relative to the plates 10 and 11. This feature, together with the curved nose 18 formed at the end of the said plates, permits the dispenser to scrape along the edges of a circular can or container in removing the ice cream from the same so that the same may be scraped clean without causing the knuckles or fingers of the user to come in contact with the edge of the can.

Within the shank 25 is slidably mounted a plunger 28 which has attached to it at one end an arcuate ejector 29 positioned between the plates 10 and 11 and adapted to be slid along between the said plates from the position shown in full lines in Figure 1 to that shown in dotted lines at 30 in Figure 1. With this means, the slice of ice cream received between the two plates 10 and 11 may be ejected from the same by advancing the plunger 28 within the shank 25. On the end of the plunger 28, we position an operating button 31, which serves to cause the said shank and the ejecting means 29 attached thereto to be readily moved between the plates 10 and 11. In using the device, the plunger 28 fits loosely within the shank 25 so that, when the dispenser is held with the nose 18 of the plates 10 and 11 downwardly, the ejecting means 29 takes the position shown in dotted lines at 30 in Figure 1. By forcing the dispenser into the bulk of the ice cream, ejector 29 is caused to move upwardly to the position shown in full lines in Figure 1. By moving the handle 27 transversely to the plates 10 and 11, the ice cream is caused to be broken off at the edges after which the same may be removed from the bulk by withdrawing the entire dispenser from the ice cream. When it is desired to eject the ice cream, the button 31 on plunger 28 is forced inwardly to cause the ejecting means 29 to eject the ice cream from between the two parallel plates 10 and 11.

To prevent the ice cream from sliding or spreading along the surface of the ejector 29 and thereby altering the shape of the same from that originally given it, the said ejector is formed with a plurality of serrations 32 extending transversely across the same, which serrations terminate at the center of ejector 29 where the same is attached to the plunger 28. When pressure is applied to the button 31, the ice cream by means of the serrations 32 is prevented from sliding outwardly and the slice of ice cream, when it leaves the dispenser, retains the same shape which it originally had.

To prevent the ice cream from slipping out of the dispenser, when the dispenser is being removed from the bulk of ice cream or is being handled after removal therefrom, we cause the lower plate 11 of the dispenser to be moved toward the plate 10 so as to squeeze or press the ice cream between the said plates in a manner to prevent the same from being accidentally removed from the said plates before it is desired to eject the same. This is accomplished as follows: As before stated, the plates 10 and 11 are constructed of a light spring material which will permit the said plates to be sprung towards one another, such movement occuring preferably in the corner connecting the said plates with the back 12. Attached to the plate 11 near the back 12, we provide a base 33 which is securely riveted thereto by means of rivets 34. This base has integrally connected with it a lever 35 which extends longitudinally of the device along the shank 25 and plunger 28 and which is closely spaced to the handle 27 and the arm 26. Lever 35 terminates at its extreme end in a thumb piece 36 by means of which the said lever may be depressed when the dispenser is grasped by the handle 27. When the thumb piece 36 is depressed by the thumb of the user, the plate 11 is caused to bend at the corner of the same which is indicated at 37 where the said plate connects with the back 12, thus causing the forward or nose end 18 of the said plate 11 to move toward the plate 10. The position of the parts after thumb piece 36 has been depressed is clearly illustrated in Figure 2, which shows that the distance between the plates 10 and 11 at the rounded nose 18 of the same is less than the distance of the same at the back end 12 of said plates. It can therefore readily be understood that, when the device is held in this manner, that the ice cream held within the same is prevented from being accidentally dropped out of the dispenser and also that the ice cream may be readily withdrawn from the bulk after the same has been severed therefrom as previously described. When the ice cream is to be ejected from the dispenser, the thumb piece 36 is released and the thumb shifted to the button 31 which is then forced outwardly to cause the ejector 29 to discharge slices of ice cream from the device.

The advantages of our invention are manifest. A device is provided which is exceedingly simple in construction and which may be readily manufactured at an economical cost. The device functions efficiently so that slices of ice cream of the desired shape may be readily cut from the bulk of the ice cream and rapidly deposited where required. A minimum number of moving parts are included in our invention which may be readily washed so that a sanitary device is at all times available.

In accordance with the patent statutes, we have described the principles of operation of our invention together with the apparatus which we now consider to represent the best embodiment thereof but we desire to have it understood that the construction shown is only illustrative and that the invention can be carried out by other means

We claim:

1. An ice cream dispenser including a pair of plates normally spaced apart and means for flexing said plates toward each other at their free ends.

2. An ice cream dispenser including a pair of parallel plates formed of relatively thin and flexible material normally spaced apart and means for flexing said plates toward each other at their free ends.

3. A dispensing device comprising a pair of parallel plates formed of relatively thin and flexible material and means secured to one of said plates for flexing it at its inner end.

4. An ice cream dispenser comprising a support, a handle secured to said support, a pair of parallel plates formed of relatively thin and flexible material secured to said support, a lever secured to one of said plates issuing rearwardly therefrom in proximity to said handle, said lever adapted to be moved toward said handle in order to flex one of said plates.

5. An ice cream dispenser comprising an ice cream cutting device consisting of parallel plates formed of relatively thin and flexible material, an ejector positioned between said plates, a handle issuing outwardly therefrom in oblique relation thereto.

6. An ice cream dispenser comprising an ice cream cutting device consisting of parallel plates formed of relatively thin and flexible material, an ejector positioned between said plates, a handle issuing outwardly therefrom in oblique relation thereto and said ejector issuing longitudinally of said cutter above said handle.

7. An ice cream dispensing device comprising a pair of cutting blades, a support connecting said cutting blades, a plunger slidably mounted in said support having an operating head at one end and an ejector secured to its other end operable between said blades and a handle issuing outwardly from said support in inclined relation to said plunger and operating head.

8. An ice cream dispensing device comprising a pair of cutting plates, an ejector positioned between said plates and means on said ejector for preventing the ice cream from moving laterally along the same as the ejector is caused to eject the ice cream from the dispenser.

9. An ice cream dispenser comprising a pair of parallel plates, an arcuate ejector positioned between said plates and slidable along the same and means formed on said ejector for preventing the ice cream from sliding transversely along the same.

10. An ice cream dispenser comprising cutting means, an ejector within said cutting means and serrated edges on said ejector for preventing ice cream from moving laterally relative to the same.

11. An ice cream dispenser comprising cutting means, an arcuate ejector within said cutting means and serrated edges on said ejector for preventing ice cream from moving laterally relative to the same.

12. An ice cream dispenser comprising a pair of parallel plates, an arcuate ejector positioned between said plates and slidable along the same and roughenings formed on said arcuate ejector for preventing the ice cream from moving laterally relative thereto.

13. An ice cream dispenser comprising a pair of parallel plates, an arcuate ejector positioned between said plates and slidable along the same and serrations formed on said arcuate ejector for preventing the ice cream from moving laterally relative thereto.

HARLAN P. GARDNER.
ALVIN O. OLAFSON.